(12) United States Patent
Terada et al.

(10) Patent No.: US 6,749,112 B2
(45) Date of Patent: Jun. 15, 2004

(54) METHOD AND PROGRAM FOR VISITOR PASS SYSTEM

(75) Inventors: Hirohito Terada, Shiga-ken (JP); Junji Takayoshi, Ohtsu (JP); Hirokazu Noto, Moriyama (JP)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 10/085,381

(22) Filed: Feb. 28, 2002

(65) Prior Publication Data

US 2002/0139845 A1 Oct. 3, 2002

(30) Foreign Application Priority Data

Mar. 28, 2001 (JP) .......................................... 2001-93452

(51) Int. Cl.[7] ................................................. G06K 5/00
(52) U.S. Cl. .................... 235/380; 235/382.5; 235/375; 235/486; 348/156; 705/5; 705/9
(58) Field of Search ............................. 235/380, 382.5, 235/375, 486, 382, 492; 348/156; 705/5, 9

(56) References Cited

U.S. PATENT DOCUMENTS

| | | | | |
|---|---|---|---|---|
| 5,604,640 A | * | 2/1997 | Zipf et al. .................... 359/803 |
| 5,877,483 A | * | 3/1999 | Bilich et al. ................. 235/382 |
| 5,947,369 A | * | 9/1999 | Frommer et al. ........... 235/382 |
| 6,189,783 B1 | * | 2/2001 | Motomiya et al. .......... 235/375 |
| 6,220,512 B1 | * | 4/2001 | Cooper ........................ 235/382 |
| 6,363,352 B1 | * | 3/2002 | Dailey et al. .................. 705/9 |
| 6,378,771 B1 | * | 4/2002 | Cooper ........................ 235/382 |
| 6,389,454 B1 | * | 5/2002 | Ralston et al. .............. 709/204 |
| 6,422,463 B1 | * | 7/2002 | Flink ........................... 235/382 |
| 6,488,205 B1 | * | 12/2002 | Jacobson ..................... 235/380 |

* cited by examiner

Primary Examiner—Michael G. Lee
Assistant Examiner—Ahshik Kim
(74) Attorney, Agent, or Firm—J. Bruce Schelkopf; Sawyer Law Group

(57) ABSTRACT

In one aspect of the present invention, a visitor pass system, visitor pass method and visitor pass program which can minimize and expedite visitor formalities, is provided. The visitor pass system comprises a visitor terminal, server and staff terminals. The visitor terminal, the server and the staff terminals are connected via a communication network. The visitor terminal may be placed at a reception area, for instance. The server is preferably a computer which can store a large number of visit data information.

24 Claims, 14 Drawing Sheets

FIG. 4

Search Screen

Visitor
- Visit date  2001/01/15
- Visitor's family name        Visitor's last name
- Company name
- Company Address
- Company phone number Meeting room
- Reserved room No.  1
- Family name                  First name
- Extention Registerer   Suzuki Taro

[Search]  [Search result display]  [END]

Enter search specification and press "Search" button

Hanako Tanaka
Head of Design Group
Development Section
Manufacturing department

World Electric & Mechanical Engineering
Industrial Co., Ltd.
10-99, OO-cho, Otsu-shi, Shiga-ken,
520-16XX, Japan
TEL (077)533-XX00
FAX (077)533-XX0X
E-mail: cocococo.com Go to Main Form — 76

METHOD AND PROGRAM FOR VISITOR PASS SYSTEM

BACKGROUND OF THE INVENTION

1. Field of the Invention

The present invention relates to a method and program for a visitor pass system for managing a visitor's entry into and departure from a company gate or the like.

2. Background of Related Art

Often, a visitor to a company or a plant is required to write his/her name, company name, purpose of visit, and the name of a receiving staff person whom he/she wants to see (hereinafter referred to as a "staff") on a predetermined form at a reception desk (e.g., a guard station next to the gate). A receptionist then makes a call to the receiving staff to announce that the visitor is coming, and the visitor receives an instruction from the staff. For example, the staff may ask the receptionist to give a message to the visitor that he/she wants to see the visitor at the lobby near the entrance of the plant. Then, as provided, the receptionist gives a pass and the message to the visitor.

Due to the complexities and inconvenience often encountered when visiting a particular site, it is desirable to have a manageable method for accommodating a visitor's entry into and departure from a company's gate, for instance.

SUMMARY OF THE INVENTION

An object of the present invention is to simplify visitor formalities. Another object of the present invention is to easily manage a visitor's entry into and departure from a company gate. A further object of the present invention is to computerize visitor formalities.

In one embodiment of the present invention, the visitor pass system for managing a visitor's entry and departure through a communication network comprises: visit data storing means for storing visit data of a visitor; input and output means for transmitting appointment data entered to the visit data storing means through the communication network to store the data therein; identification data reading means for reading identification data from identification means of the visitor; visitor identifying means for identifying the visitor on the basis of the identification data and preparing visitor's data; and visitor's data transmitting means for transmitting the visitor's data to the visit data storing means through the communication network to store the visitor's data therein.

In another embodiment of the present invention, a visitor pass system for managing visitor's entry and departure through a communication network comprises: visit data storing means for storing visit data of a visitor; input and output means for transmitting appointment data entered to the visit data storing means through the communication network to store the data therein; identification data reading means for reading identification data from identification means of the visitor; visitor identifying means for identifying the visitor on the basis of the identification data and preparing visitor's data; appointment data retrieving means for retrieving appointment data related to the visitor's data from the visit data storing means through the communication network; and arrival notification data transmitting means for transmitting data to notify the visitor's arrival to the input and output means through the communication network.

In another embodiment of the present invention, the visitor pass system for managing visitor's entry and departure through a communication network comprises: visit data storing means for storing visit data of a visitor; input and output means into which a staff enters appointment data and from which the appointment data is transmitted to the visit data storing means to store the data therein; identification data reading means for reading identification data from identification means of the visitor; visitor identifying means for identifying the visitor on the basis of the identification data and preparing visitor's data; appointment data retrieving means for retrieving appointment data related to the visitor's data from the visit data storing means through the communication network; and permit data output means for outputting permit data when the appointment data related to the visitor's data is found.

In another aspect of the present invention, a further embodiment provides a visitor pass method for managing visitor's entry and departure through a communication network which comprises the steps of: (a) reading identification data from identification means of a visitor by identification data reading means; (b) identifying the visitor on the basis of the identification data and preparing visitor's data by visitor identifying means; and (c) transmitting the visitor's data to visit data storing means through the communication network by visitor's data transmitting means to store the data therein.

In another embodiment of the present invention, the visitor pass method for managing visitor's entry and departure through a communication network comprises the steps of: (a) transmitting appointment data to the visit data storing means through the communication network to store the data therein, said appointment data entered into input and output means by a staff; (b) reading identification data from identification means of a visitor by identification data reading means; (c) identifying the visitor on the basis of the identification data and preparing visitor's data by visitor identifying means; (d) retrieving appointment data related to the visitor's data from the visit data storing means through the communication network by appointment data retrieving means; and (e) transmitting data to notify the visitor's arrival to the input and output means through the communication network by arrival notification data transmitting means.

In another embodiment of the present invention, the visitor pass method for managing visitor's entry and departure through a communication network comprises the steps of: (a) transmitting appointment data to the visit data storing means through the communication network to store the data therein, said appointment data entered into input and output means by a staff; (b) reading identification data from identification means of a visitor by identification data reading means; (c) identifying the visitor on the basis of the identification data and preparing visitor's data by visitor identifying means; (d) retrieving appointment data related to the visitor's data from the visit data storing means through the communication network by appointment data retrieving means; and (e) outputting permit data by permit data output means when the appointment data related to the visitor's data is found.

In another aspect of the present invention, a further embodiment of the present invention provides a visitor pass program for managing visitor's entry and departure through a communication network which comprises instructions for causing a computer to perform the steps of: reading identification data from identification means of a visitor; identifying the visitor on the basis of the identification data and preparing visitor's data; and transmitting the visitor's data to visit data storing means for storing visitor's visit data through the communication network to store the data therein.

In another embodiment of the present invention, the visitor pass program for managing visitor's entry and departure through a communication network comprises instructions for causing a computer to perform the steps of: transmitting appointment data entered to visit data storing means for storing visitor's visit data through the communication network to store the data therein; reading identification data from identification means of a visitor; identifying the visitor on the basis of the identification data and preparing visitor's data; retrieving appointment data related to the visitor's data from the visit data storing means through the communication network; and transmitting data to notify the visitor's arrival to the input and output means through the communication network.

In another embodiment of the present invention, the visitor pass program for managing visitor's entry and departure through a communication network comprises instructions for causing computer to perform the steps of: transmitting appointment data entered to visit data storing means for storing visitor's visit data through the communication network to store the data therein; reading identification data from identification means of a visitor; identifying the visitor on the basis of the identification data and preparing visitor's data; retrieving appointment data related to the visitor's data from the visit data storing means through the communication network; and outputting permit data when the appointment data related to the visitor's data is found.

In the visitor pass system comprising visitor data transmitting means and the visitor pass method according to the present invention, visitor's data such as a name, telephone number, arrival and departure time, and the like can be stored in visit data storing means. Therefore, the visitor pass system and method according to the present invention can minimize visitor formalities and reduce congestion in the reception, and thus improve customer service. In such system and method, the visitor can be identified easily by identification means such as a visitor's business card. Further, all the visitors' data can be stored in the visit data storing means through the communication network, so that data retrieval and management can be easily conducted. Furthermore, in such system and method, appointment data can be transmitted from the input and output means to the server to store it in the server, so that the expected visitor and the actual visitor can be compared to determine if they match.

In the visitor pass system comprising appointment data retrieving means and arrival notification data transmitting means and the visitor pass method, the actual visitor and the expected visitor can be compared to determine if they match, and then the visitor can obtain a chance to send a notification of arrival to a staff. Therefore, if the actual visitor is not the expected visitor or if the identification data reading means wrongly reads the identification data, and reduces the likelihood of making the visitor unpleasant.

In the visitor pass system comprising appointment data retrieving means and the permit data output means and the visitor pass method according to the present invention, permit data can be output automatically when it is determined that the actual visitor is the same person as the expected visitor. On the contrary, when the actual visitor is not the same person as the expected visitor, permit data can be output through predetermined procedures.

In this visitor pass system in which the visitor identifying means includes number entry means, even if the bar code reader wrongly reads a bar code and determines that the actual visitor is not the same person as the expected visitor, it can be re-determined whether the actual visitor is the same person as the expected visitor in accordance with the number entered by the actual visitor. Thus, this system reduces the likelihood of the visitor becoming unpleasant In the visitor pass system comprising identification data comparing means according to the present invention, two or more kinds of data obtained from the visitor can be compared to determine whether the actual visitor is the expected visitor or not. For example, if an illegally obtained business card is used, the system can determine that the actual visitor is different from the expected visitor.

In the visitor pass system comprising read command means according to the present invention, the second identification data reading means is ready to read only after the first identification data reading means determines whether the actual visitor is the expected visitor or not For example, where the first identification data reading means is a bar code reader and the second identification data reading means is a business card reading means, the bar code reader first checks the identity of the visitor through the bar code, and then visitor's data can be read by the business card reader if it is determined that the visitor is the expected person.

In the visitor pass system comprising means for controlling output of permit data, after the second identification data reading means is ready to read, the second reading means determines whether the actual visitor is the expected visitor or not If the visitor is the expected person, permit data can be output. Thus, the identity of the visitor can be checked twice, and therefore this visitor pass system can serve as an improved security system.

BRIEF DESCRIPTION OF THE DRAWINGS

The invention, together with its various features and advantages, can be readily understood from the following more detailed description taken in conjunction with the Figures herein below:

FIG. 4 shows a search screen of the staff terminal in the visitor pass system shown in FIG. 1.

FIG. 9 shows a screen of the visitor terminal in the visitor pass system shown in FIG. 1 which displays a scanned business card.

DETAILED DESCRIPTION OF THE INVENTION

The preferred embodiments of the present invention are described below with reference to the accompanying figures.

Figure 1:
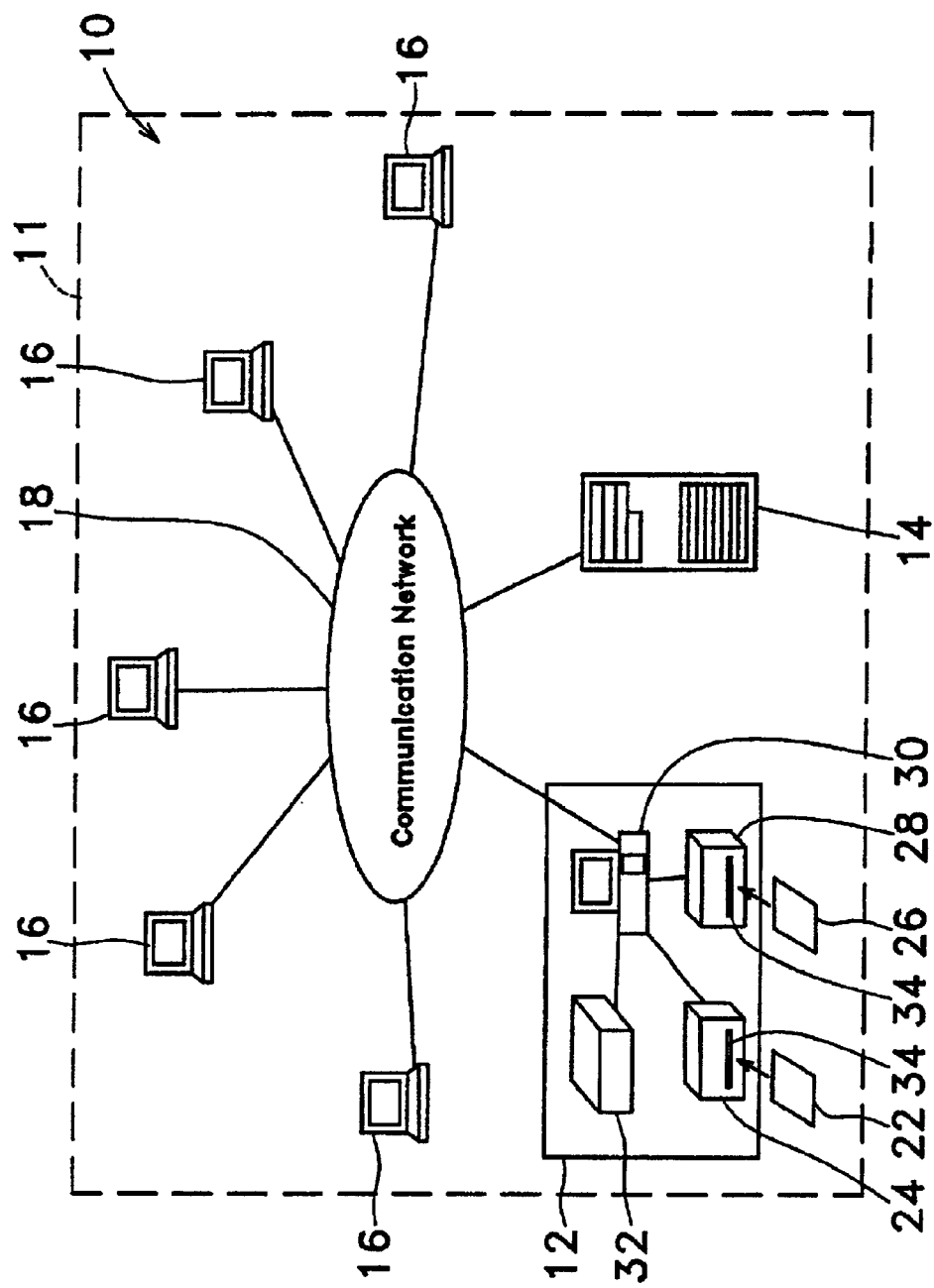
FIG. 1 shows an embodiment of a visitor pass system according to the present invention.

As shown in FIG. 1, a visitor pass system 10 comprises a visitor terminal 12, a server 14, and staff terminals 16, and is located, for example, in a sales office 11. The visitor terminal 12, server 14 and staff terminals 16 are connected via a communication network 18. The visitor terminal 12 is placed at a reception. The server 14 is a computer including a memory which can store a large amount of visit data. The staff terminal 16 is a computer which is used by an individual staff in the sales office 11. As used herein, the term "communication network" means a signal data communication network using a computer, such as an Internet communication, intranet communication, extranet communication, and local area network communication.

The visitor terminal 12 comprises a bar code reader 24 for reading a bar code provided on a business card 22 which is previously handed to a visitor by a staff, a business card reader 28 for reading a visitor's business card, a personal computer (PC) for processing data, and a printer 32 for printing a visitor pass. The bar code reader 24 comprises a card slot 34 for inserting the business card 22 so as to read a bar code provided thereon. The business card reader 28 includes an image scanner for reading image data from the business card, a card slot 34 for inserting the business card, and an ejecting means for returning the business card after reading. The bar code reader 24 functions as first identification data reading means, and the business card reader 28 functions as second identification data reading means.

Figure 2:
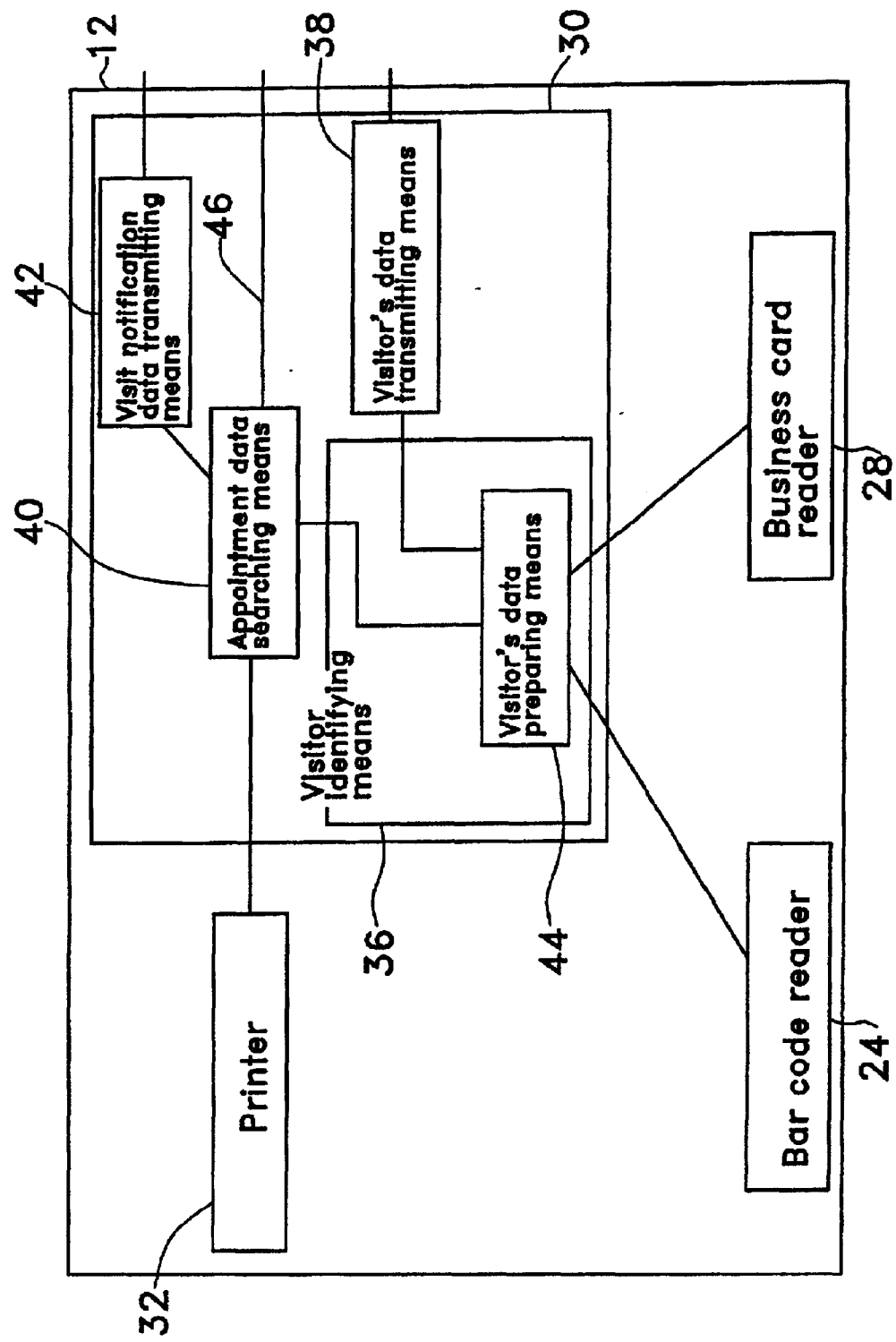
FIG. 2 shows a visitor terminal in the visitor pass system shown in FIG. 1.

The PC 30 includes a memory for storing programs and functions as a visitor identifying means 36, visitor's data transmitting means 38, appointment data retrieving means 40, and arrival notification data transmitting means 42, as shown in FIG. 2. The visitor identifying means 36 includes visitor's data preparing means 44. The means 44 receives image data read by the business card reader 28, converts the image data into text data, identifies a telephone number by the text data, and stores the telephone number. A telephone number is identified by searching the data for the keyword "telephone" and "TEL". A telephone number is included in visitor's data. The visitor's data transmitting means 38 transmits visitor's data including the telephone number to the server 14 for storage in the memory of the server 14.

Figure 6:
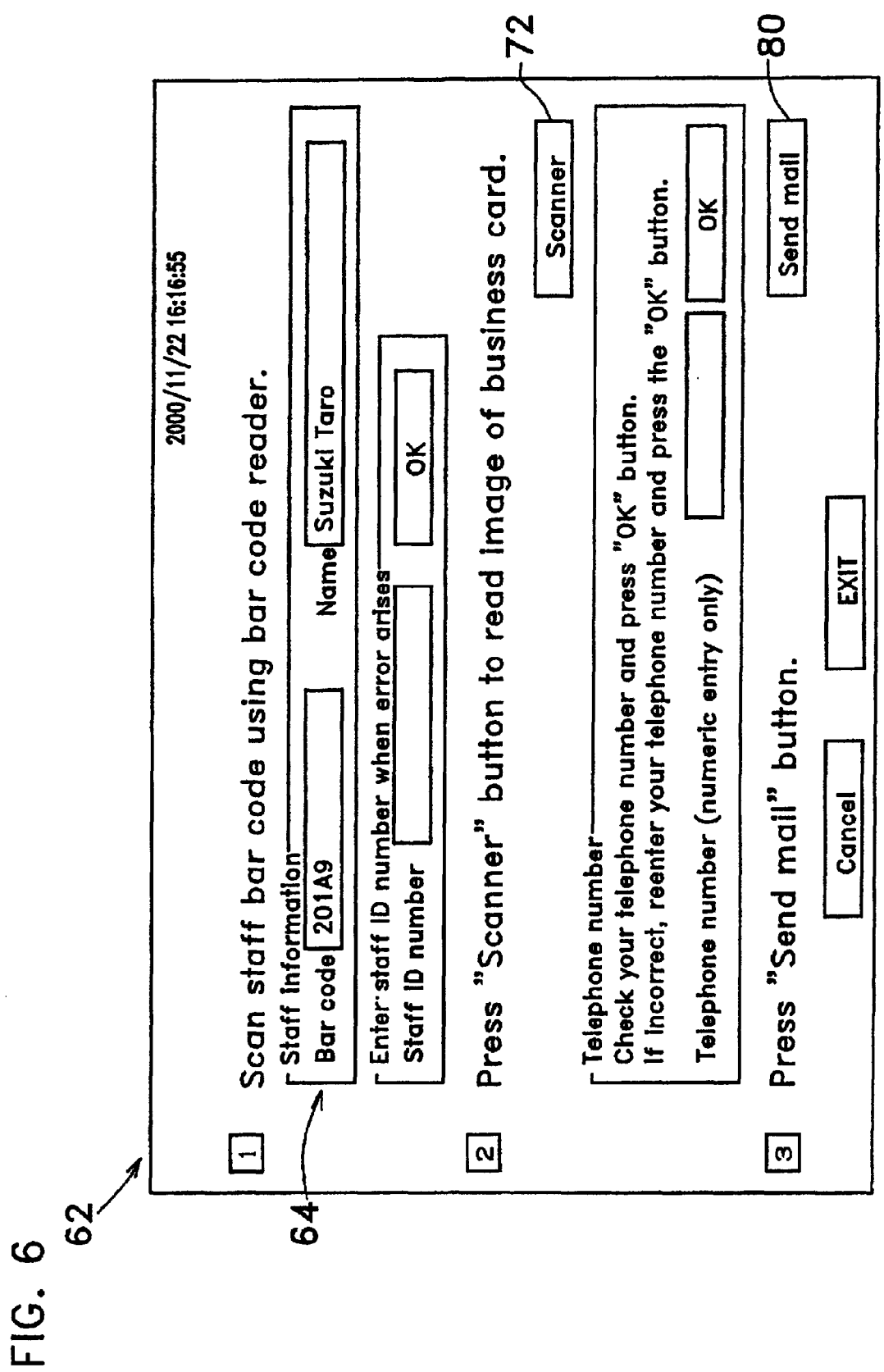
FIG. 6 shows a screen of the visitor terminal displaying a scanned bar code in the visitor pass system shown in FIG. 1.

The bar code provided on the business card 22 represents a staff ID number, which is read by the bar code reader 24. For example, FIG. 6 shows the case where the staff ID number is 201A9. The visitor's data preparing means 44 comprises number entering means for entering a staff ID number into the PC 30 using a keyboard, mouse, or the like.

The appointment data retrieving means 40 retrieves appointment data including a staff ID number and a visitor's telephone number, which are received from the visitor's data preparing means 44, from the server 14. The means 40 comprises means for storing arrival notification data including the appointment data, means for storing a staff ID number as source data, and means for transmitting an instruction to output a visitor pass to the printer 32. The arrival notification data transmitting means 42 finds out a target staff terminal 16 from a plurality of staff terminals 16 on the basis of the source data and transmits the visitor's data to the target staff terminal 16. The printer functions as permit data output means. The permit data is provided on a visitor pass card.

The server 14 functions as visit data storing means. The visit data includes visitor's data and appointment data. The visitor's data is data on the person who actually meet the staff, and the appointment data is data on the person who made an appointment The visitor data includes a telephone number of the visitor which is sent from the visitor's data transmitting means 38. The appointment data includes a visitor's name, company name, address, telephone number, expected arrival time, expected departure time, meeting room number, name of a staff to meet, staff ID number, intra-company e-mail address, extension line number, and so on. The staff terminal 16 is used as input and output means by a staff, and receives data to notify a visitor's arrival from the visitor terminal.

Figure 3:
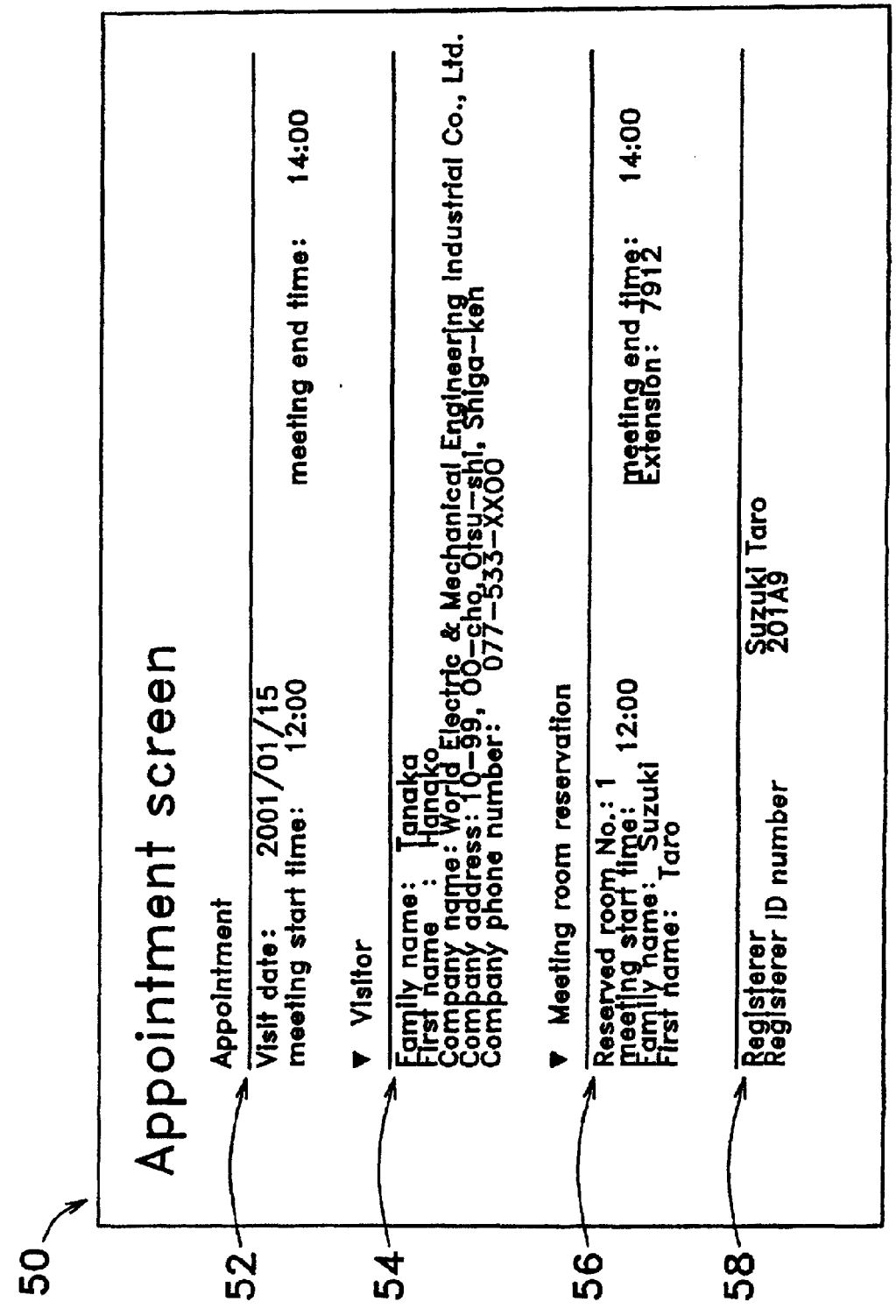
FIG. 3 shows an appointment screen of a staff terminal in the visitor pass system shown in FIG. 1.

Next, a visitor pass method using the visitor pass system will be described. First, a staff registers a visitor's appointment using the staff terminal 16. The staff enters an appointment data using an appointment screen 50 shown in FIG. 3. The appointment data is entered into a section 52 for displaying a visitor's visiting date and time, a section 54 for displaying visitor's data such as visitor's name, a section 56 for displaying a meeting room number, and a section 58 for displaying data on the staff. In the section 58, a registerer ID number is a staff ID number. If a meeting room is not to be used, the staff leaves the section 56 blank. The entered appointment data is sent to the server 14 via the communication network 18. The staff can retrieve a certain appointment data from stored data using a search screen shown in FIG. 4.

Figure 5:
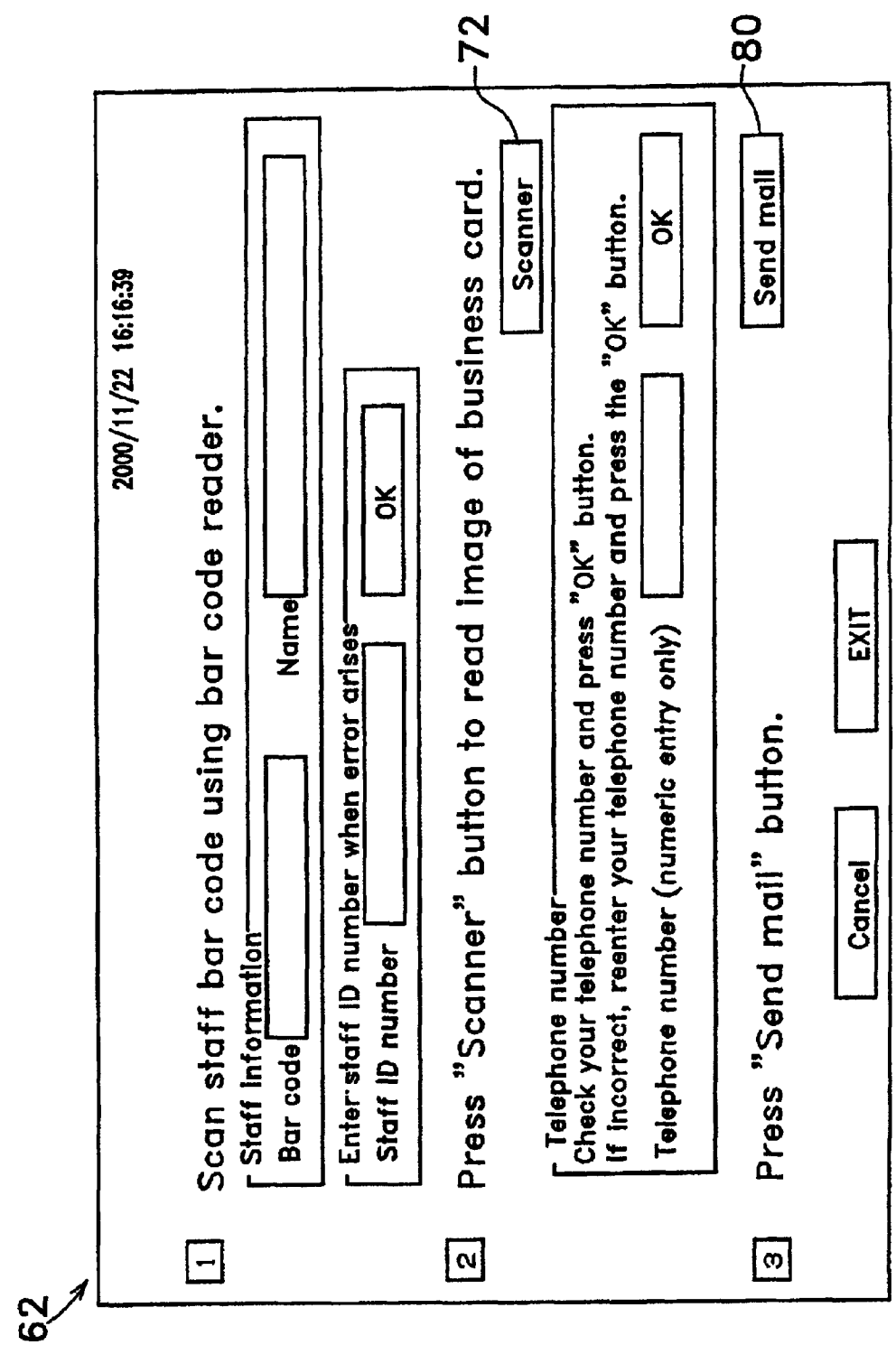
FIG. 5 shows an initial screen of a visitor terminal in the visitor pass system shown in FIG. 1.

The visitor's appointment is thus registered. The visitor visits the reception of the sales office 11 on the scheduled date and time. At the reception, a screen 62 for visitors is displayed on the PC 30 or can be displayed under a manipulation of the visitor, as shown in FIG. 5. Instructions for the screen 62 is posted on a bulletin board near the PC 30. In accordance with the instructions, the visitor inserts a business card 22 with a bar code provided thereon into the bar code reader 24. The business card 22 had previously been handed to the visitor by the staff.

Figure 7:
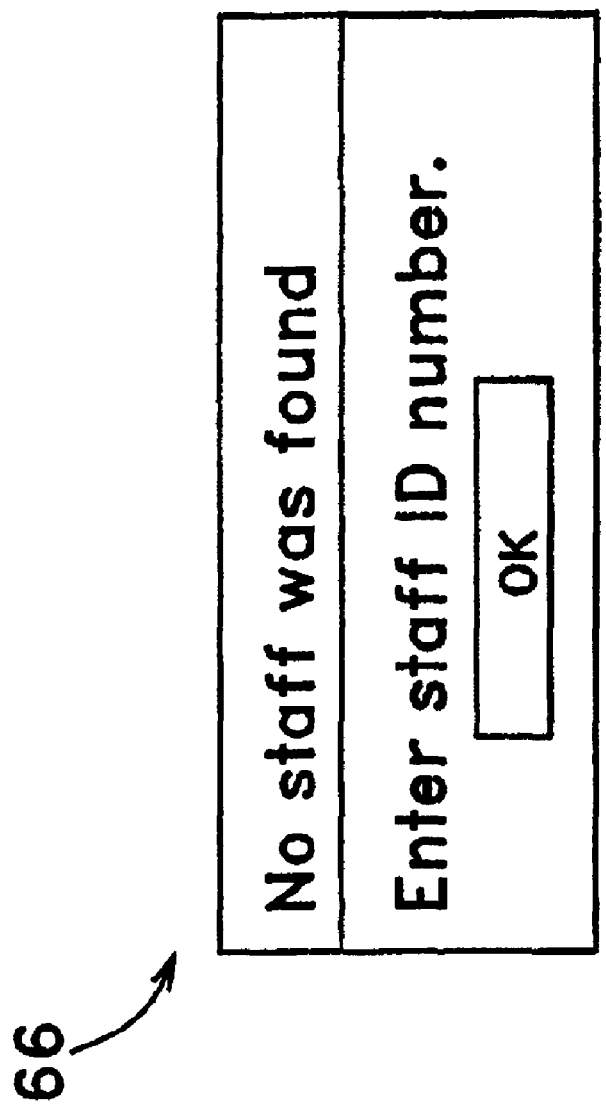
FIG. 7 shows a screen of the visitor terminal in the visitor pass system shown in FIG. 1 which requests the visitor to enter a staff ID number.
Figure 8:
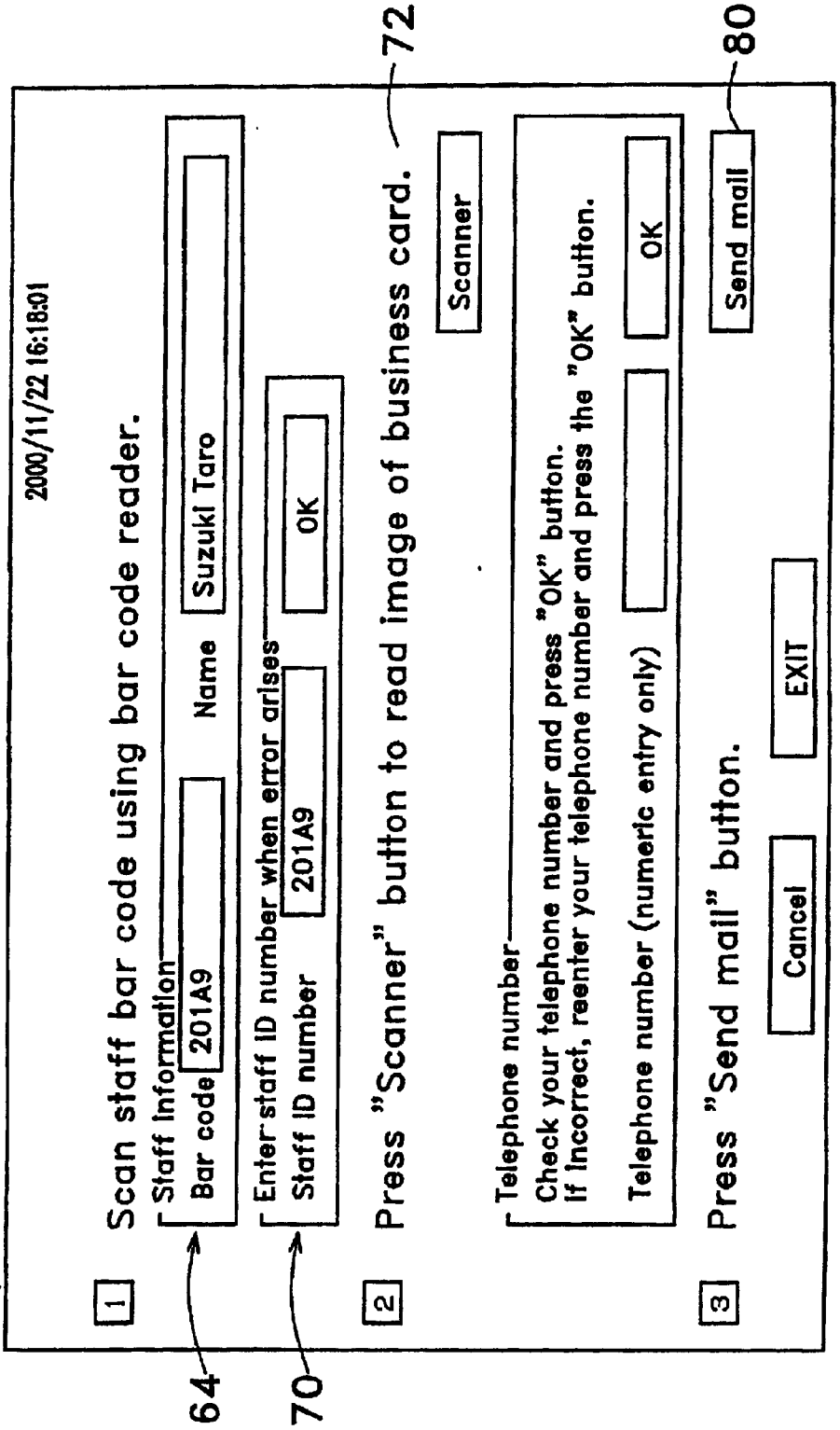
FIG. 8 shows a screen of the visitor terminal in the visitor pass system shown in FIG. 1 which displays the entered staff ID number.

Next, the bar code reader 24 reads the staff ID number from the bar code provided on the business card 22. The staff ID number read by the reader 24 is sent to the PC 30. The appointment data retrieving means 40 sends the staff ID number through a line 46 to retrieve the data containing this ID number from the server 14. Where the data containing the target ID number is found, the ID number is stored in the source data storing means as source data. The staff ID number is displayed in a section 64 on the screen 62, as shown in FIG. 6. Where the data containing the target ID number is found, a scanner button 72 can be pressed.

Where the data containing the target ID number is not found, a message notifying that no person was found and requesting to enter a staff ID number appears on the screen 66, as shown in FIG. 7. When the visitor press the "OK" button, the "Staff ID number" input screen (not shown) appears. When the visitor enters the staff ID number, the staff ID number is displayed in the staff ID number display section 70, as shown in FIG. 8. The PC 30 retrieves the appointment data containing this ID number from the server 14. The retrieved data is stored in the source data storing means as source data. The ID number is displayed in the staff ID number display section 64 on the screen 62, as shown in FIG. 8. When there is the appointment data containing this ID number, the scanner button 72 can be pressed.

Figure 10:
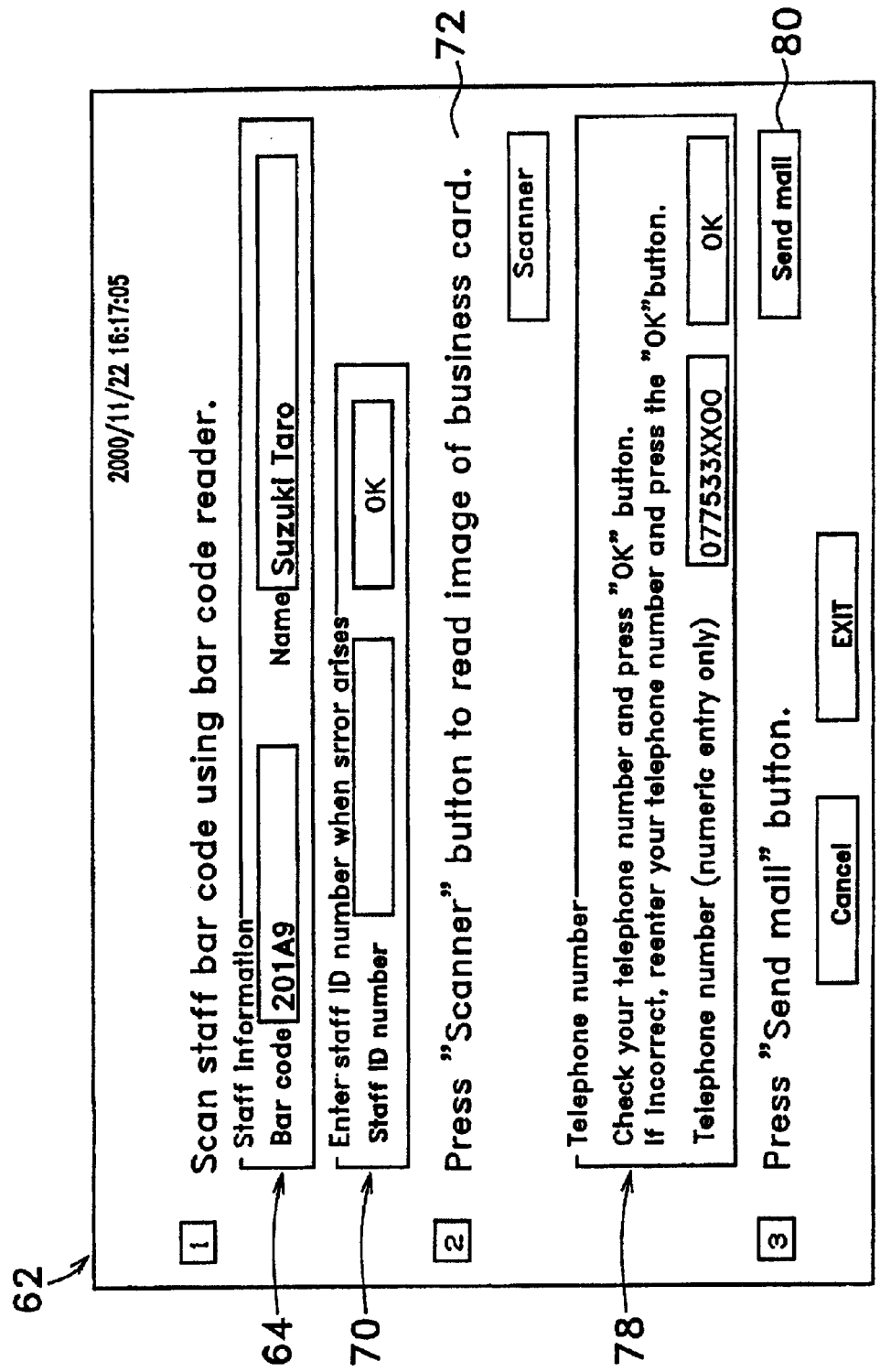
FIG. 10 shows a screen of the visitor terminal in the visitor pass system shown in FIG. 1 which displays a telephone number of the visitor.

Then, when the visitor inserts his/her own business card 26 into the business card reader 28 and presses the scanner button 72, data is read off the business card 26 as displayed on the screen 74 shown in FIG. 9. The visitor's data preparing means 44 of the PC 30 identifies the telephone number of the visitor on the basis of the image data of the business card 26 and stores this number. When the visitor presses the "Go To Main Form" button 76, the telephone number is displayed in the telephone number display section 78, as shown in FIG. 10. If the displayed number is correct, the visitor presses the "OK" button in the telephone number display portion 78. On the contrary, if the displayed number is not correct, the visitor reenters the correct telephone number and then presses the "OK" button. The appointment data retrieving means 40 of the PC 30 sends the telephone number through the line 46 to retrieve the appointment data containing this telephone number from the server 14.

Figure 11:
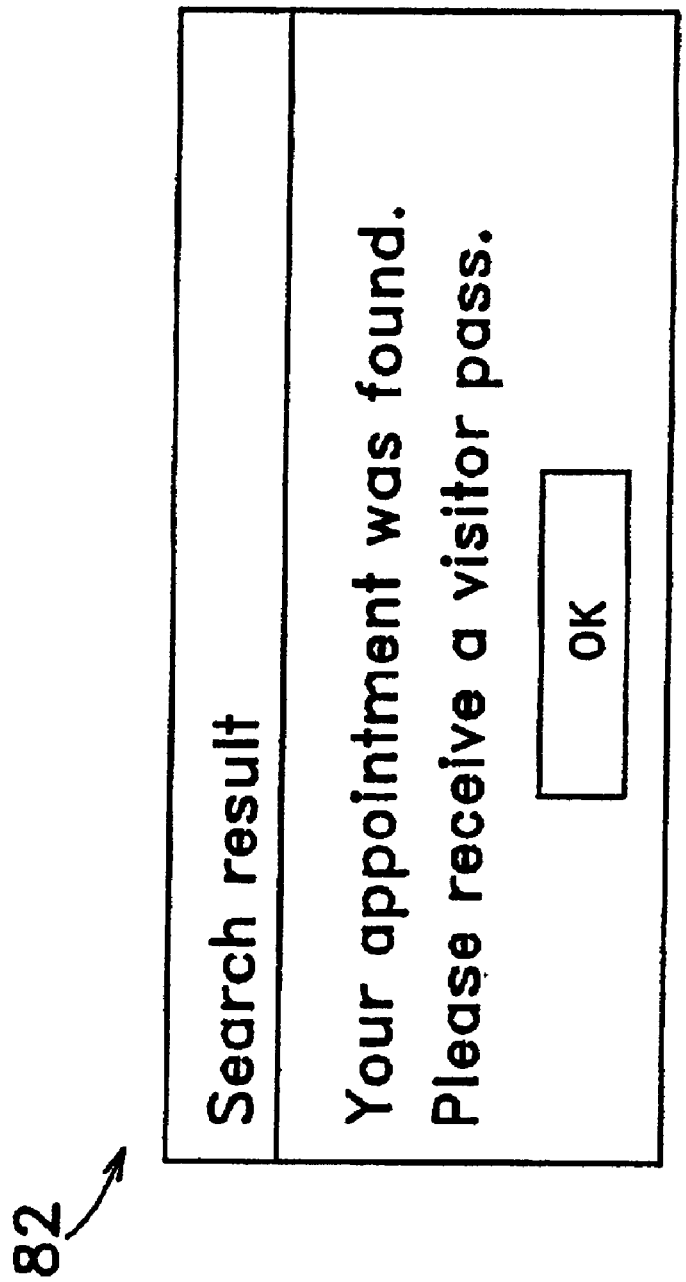
FIG. 11 shows a screen of the visitor terminal in the visitor pass system shown in FIG. 1 which requests the visitor to receive a visitor pass.
Figure 12:
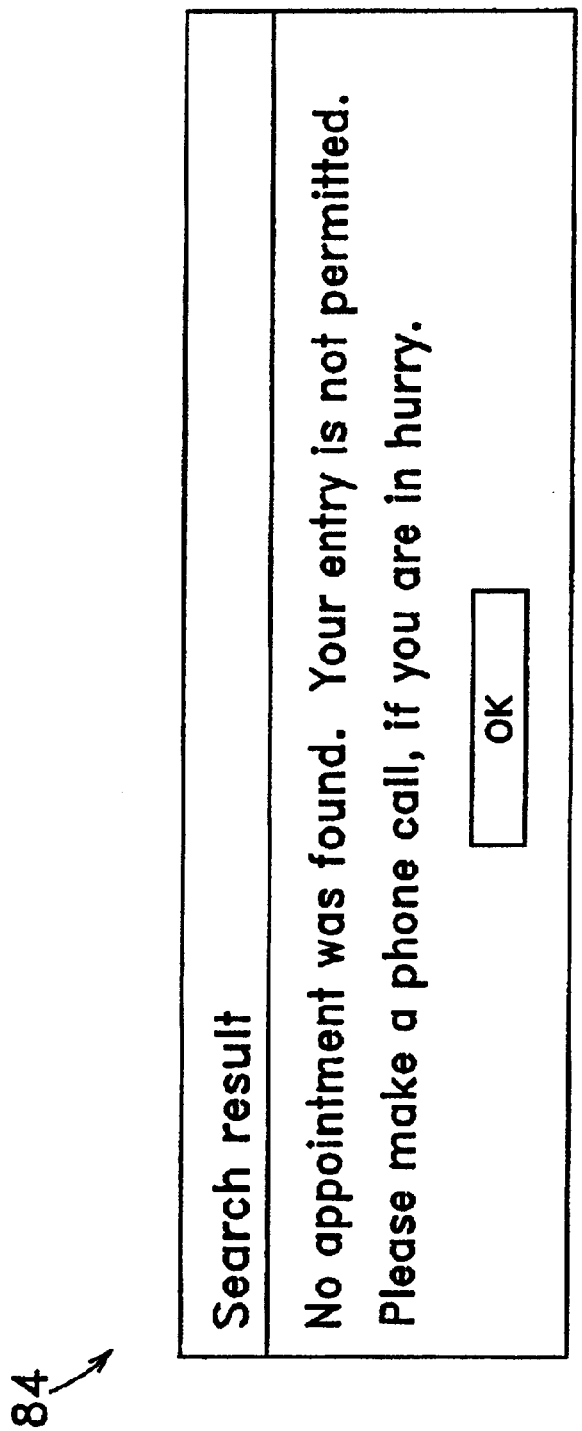
FIG. 12 shows a screen of the visitor terminal in the visitor pass system shown in FIG. 1 which displays a message that the visitor's entry is not permitted.

When the visitor presses the "Send mail" button 80, arrival notification data is sent to the staff, regardless of the presence or absence of the appointment data. Where there is the target appointment data, the "Search result" screen 82 notifying that the visitor's entry is permitted appears on the PC 30, as shown in FIG. 11, and a visitor pass is provided on the printer 32. Receiving the visitor pass, the visitor can thus enter a company gate. On the contrary, where there is no target appointment data, the "Search result" screen 84 notifying that the visitor's entry is not permitted appears on the PC 30, as shown in FIG. 12, and a visitor pass is not provided on the printer 32.

While one embodiment of the present invention has thus been described, it should be understood that the present invention can also be materialized in other embodiments.

Figure 13:
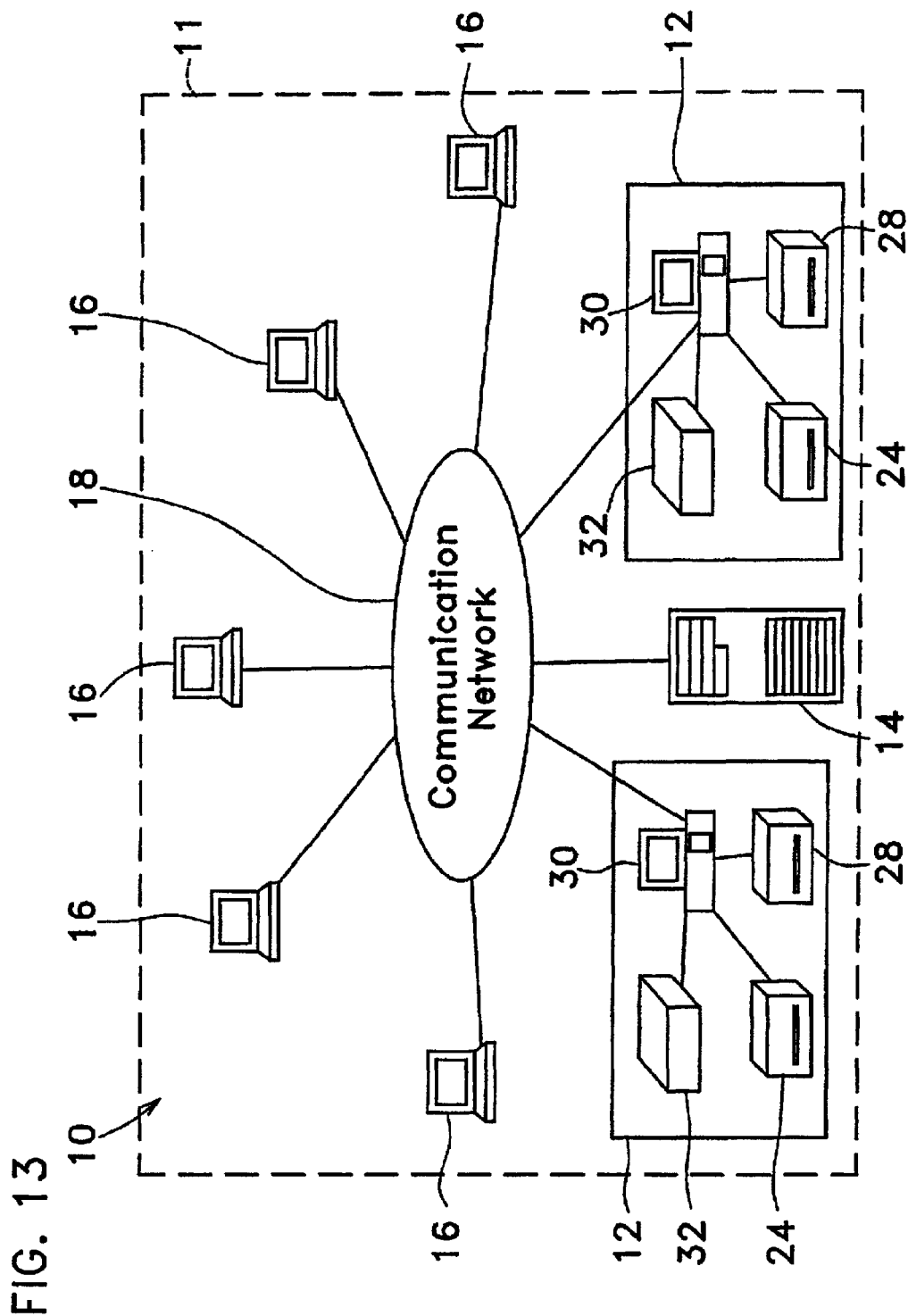
FIG. 13 shows another embodiment of the visitor pass system according to the present invention.
Figure 14:
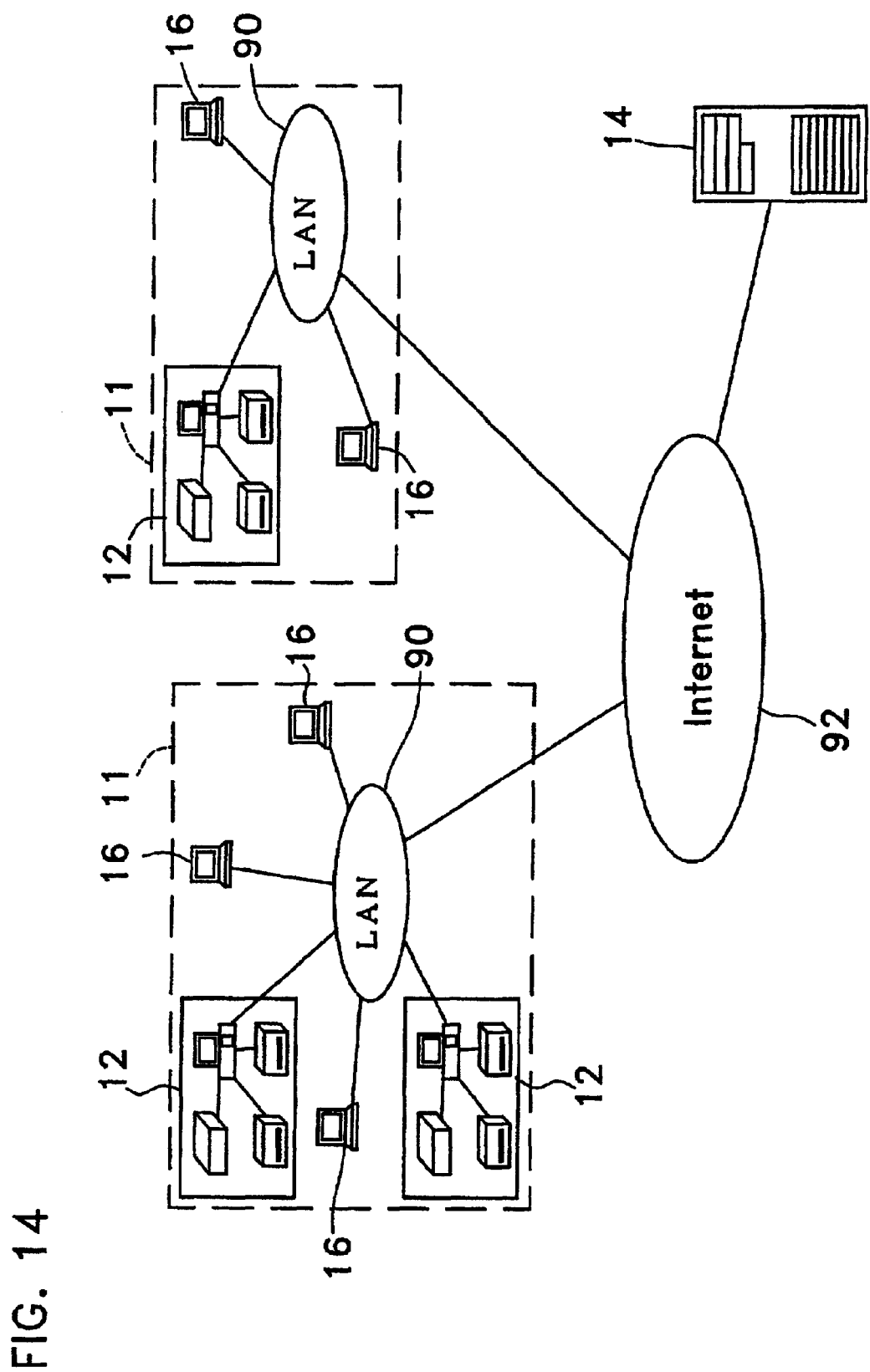
FIG. 14 shows still another embodiment of the visitor pass system according to the present invention.

For example, another embodiment is shown in FIG. 13. In this embodiment, there are a plurality of receptions in one sales office 11 and a visitor terminal 12 is placed at each reception desk. Another embodiment of the present invention is shown in FIG. 14. In this embodiment, there are a plurality of sales offices 11. In each sales office, a visitor terminal 12 and a staff terminal 16 are coupled to the LAN (local area network). The respective LANs 90 and the server 14 are connected through the Internet 92.

While the embodiments of the present invention have thus been described, it should be understood that the present invention is not limited to the above embodiments. Many changes, modifications, variations, other uses and applications can be made to the embodiments by those skilled in the art without departing from the scope of the present invention

What is claimed is:

1. A visitor pass system for managing visitor's entry and departure, through a communication network, comprising:
    a visit data storing means for storing visit data of a visitor;
    an input and output means for entering appointment data and transmitting the appointment data to the visit data storing means through the communication network to store the data therein;
    an identification data reading means for reading identification data from identification means of the visitor;
    a visitor identifying means for identifying the visitor on the basis of the identification data and for preparing visitor's data; and,
    a visitor's data transmitting means for transmitting the visitor's data to the visit data storing means through the communication network to store the visitor's data therein;
    an appointment data retrieving means for retrieving appointment data related to the visitor's data from the visit data storing means through the communication network; and
    a permit data output means for outputting permit data on a card when the appointment data related to the visitor's data is found.

2. The visitor pass system according to claim 1, further comprising:
    appointment data retrieving means for retrieving appointment data related to the visitor's data from the visit data storing means through the communication network; and,
    arrival notification data transmitting means for transmitting data to notify the visitor's arrival to the input and output means through the communication network.

3. The visitor pass system according to claim 2, wherein said arrival notification data transmitting means transmits arrival notification data to the input and output means through the communication network when the appointment data related to the visitor's data is found.

4. The visitor pass system according to claim 1, wherein said permit data is entry permit data or departure permit data.

5. The visitor pass system according to claim 1, wherein said system is capable of providing an instruction to transmit the permit data from the input and output means to the permit data output means through the communication network.

6. The visitor pass system according to claim 1, further comprising means for unlocking or opening a gate by recognizing the permit data provided on the card.

7. A visitor pass system for managing visitor's entry and departure, through a communication network, comprising:
    a visit data storing means for storing visit data of a visitor;
    an input and output means for entering appointment data and transmitting the appointment data to the visit data storing means through the communication network to store the data therein;
    an identification data reading means for reading identification data from identification means of the visitor;
    a visitor identifying means for identifying the visitor on the basis of the identification data and preparing visitor's data;
    an appointment data retrieving means for retrieving appointment data related to the visitor's data from the visit data storing means through the communication network;
    an arrival notification data transmitting means for transmitting data to notify the visitor's arrival to the input and output means through the communication network; and
    a permit data output means for outputting permit data on a card when the appointment data related to the visitor's data is found.

8. The visitor pass system according to claim 7, wherein said arrival notification data transmitting means transmits arrival notification data to the input and output means through the communication network when the appointment data related to the visitor's data is found.

9. A visitor pass system for managing visitor's entry and departure, through a communication network, comprising:
    a visit data storing means for storing visit data of a visitor;
    an input and output means for entering appointment data and transmitting the appointment data to the visit data storing means through the communication network to store the data therein;

an identification data reading means for reading identification data from identification means of the visitor;

a visitor identifying means for identifying the visitor on the basis of the identification data and preparing visitor's data;

appointment data retrieving means for retrieving appointment data related to the visitor's data from the visit data storing means through the communication network; and, a permit data output means for outputting permit data on a card when the appointment data related to the visitor's data is found.

10. The visitor pass system according to claim 3, wherein said identification data reading means includes first and second identification data reading means.

11. The visitor pass system according to claim 9, wherein said permit data is entry permit data or departure permit data.

12. The visitor pass system according to claim 9, wherein said system is capable of providing an instruction to transmit the permit data from the input and output means to the permit data output means through the communication network.

13. The visitor pass system according to claim 10, wherein said identification means includes a business card and at least said second identification data reading means includes a business card reader for reading characters provided on a visitor's business card as the identification data.

14. The visitor pass system according to claim 10, further comprising permit data output controlling means for allowing the permit data output means to output permit data when there is appointment data related to visitor's data prepared on the basis of identification data read by the second identification data reading means.

15. The visitor pass system according to claim 13, wherein said identification means includes a bar code and at least said first identification data reading means includes a bar code reader.

16. The visitor pass system according to claim 15, wherein said bar code is provided on a staff's business card.

17. The visitor pass system according to claim 15, wherein said visitor identifying means includes number entering means and said appointment data retrieving means retrieves appointment data related to the number entered into the number entering means when there is no appointment data related to visitor's data prepared on the basis of a bar code read by the bar code reader.

18. The visitor pass system according to claim 16, wherein said visitor identifying means includes number entering means and said appointment data retrieving means retrieves appointment data related to the number entered into the number entering means when there is no appointment data related to visitor's data prepared on the basis of a bar code read by the bar code reader.

19. A visitor pass method for managing visitor's entry and departure, through a communication network, comprising the steps of:

(a) transmitting appointment data to the visit data storing means through the communication network to store the data therein, said appointment data entered into input and output means by a staff;

(b) reading identification data from identification means of a visitor by identification data reading means;

(c) identifying the visitor on the basis of the identification data and preparing visitor's data by visitor identifying means;

(d) transmitting the visitor's data to visit data storing means through the communication network by visitor's data transmitting means to store the data therein;

(e) retrieving appointment data related to the visitor's data from the visit data storing means through the communication network; and (f) outputting permit data on a card when the appointment data related to the visitor's data is found.

20. A visitor pass method for managing visitor's entry and departure, through a communication network, comprising the steps of:

(a) transmitting appointment data to the visit data storing means through the communication network to store the data therein, said appointment data entered into input and output means by a staff;

(b) reading identification data from identification means of a visitor by identification data reading means;

(c) identifying the visitor on the basis of the identification data and preparing visitor's data by visitor identifying means;

(d) retrieving appointment data related to the visitor's data from the visit data storing means through the communication network by appointment data retrieving means;

(e) transmitting data to notify the visitor's arrival to the input and output means through the communication network by arrival notification data transmitting means; and (f) outputting permit data on a card when the appointment data related to the visitor's data is found.

21. A visitor pass method for managing visitor's entry and departure, through a communication network, comprising the steps of:

(a) transmitting appointment data to the visit data storing means through the communication network to store the data therein, said appointment data entered into input and output means by a staff;

(b) reading identification data from identification means of a visitor by identification data reading means;

(c) identifying the visitor on the basis of the identification data and preparing visitor's data by visitor identifying means;

(d) retrieving appointment data related to the visitor's data from the visit data storing means through the communication network by appointment data retrieving means; and, (e) outputting permit data on a card when the appointment data related to the visitor's data is found.

22. A visitor pass program for managing visitor's entry and departure, through a communication network, comprising instructions for causing a computer to perform the steps of:

(a) reading identification data from identification means of a visitor;

(b) identifying the visitor on the basis of the identification data and preparing visitor's data;

(c) transmitting the visitor's data to visit data storing means for storing visitor's visit data through the communication network to store the data therein.

(d) retrieving appointment data related to the visitor's data from the visit data storing means through the communication network; and (e) outputting permit data on a card when the appointment data related to the visitor's data is found.

23. A visitor pass program for managing visitor's entry and departure, through a communication network, comprising instructions for causing a computer to perform the steps of:
   (a) transmitting appointment data entered by a staff to visit data storing means for storing visitor's visit data through the communication network to store the data therein;
   (b) reading identification data from identification means of a visitor;
   (c) identifying the visitor on the basis of the identification data and preparing visitor's data;
   (d) retrieving appointment data related to the visitor's data from the visit data storing means through the communication network;
   (e) transmitting data to notify the visitor's arrival to the input and output means through the communication network; and
   (f) outputting permit data on a card when the appointment data related to the visitor's data is found.

24. A visitor pass program for managing visitor's entry and departure, through a communication network, comprising instructions for causing a computer to perform the steps of:
   (a) transmitting appointment data entered by a staff to visit data storing means for storing visitor's visit data through the communication network to store the data therein;
   (b) reading identification data from identification means of a visitor;
   (c) identifying the visitor on the basis of the identification data and prepare visitor's data;
   (d) retrieving appointment data related to the visitor's data from the visit data storing means through the communication network; and
   (e) outputting permit data on a card when the appointment data related to the visitor's data is found.

\* \* \* \* \*